United States Patent
Takao et al.

(10) Patent No.: US 9,663,665 B2
(45) Date of Patent: May 30, 2017

(54) EMULSION TYPE PAINT

(71) Applicant: HOEI SANGYO Co., Ltd., Sakai-shi (JP)

(72) Inventors: Kazumi Takao, Osaka (JP); Hidehiko Minami, Sakai (JP)

(73) Assignee: HOEI SANGYO Co., Ltd., Sakai-shi (JP)

(*) Notice: Subject to any disclaimer, the term of this patent is extended or adjusted under 35 U.S.C. 154(b) by 0 days.

(21) Appl. No.: 14/911,777

(22) PCT Filed: Jan. 20, 2016

(86) PCT No.: PCT/JP2016/051499
§ 371 (c)(1),
(2) Date: Feb. 12, 2016

(87) PCT Pub. No.: WO2016/129340
PCT Pub. Date: Aug. 18, 2016

(65) Prior Publication Data
US 2016/0230020 A1    Aug. 11, 2016

(30) Foreign Application Priority Data
Feb. 10, 2015    (JP) ................. 2015-023898

(51) Int. Cl.
*C08K 9/02* (2006.01)
*C09D 5/02* (2006.01)
*C09D 7/12* (2006.01)

(52) U.S. Cl.
CPC ........... *C09D 5/028* (2013.01); *C09D 7/1216* (2013.01); *C09D 7/1291* (2013.01)

(58) Field of Classification Search
CPC ....... C09D 5/028; C09D 5/022; C09D 7/1216
See application file for complete search history.

(56) References Cited

U.S. PATENT DOCUMENTS

2004/0214950 A1* 10/2004 Nakamura ............. C08L 53/02
                                                                  525/88
2005/0070429 A1*  3/2005 Ruike ................... B01J 21/063
                                                                  502/350

FOREIGN PATENT DOCUMENTS

JP           11-009965 A      1/1999

* cited by examiner

*Primary Examiner* — Hannah Pak
(74) *Attorney, Agent, or Firm* — Locke Lord LLP

(57) ABSTRACT

Buildings surfaces are often seen subjected to application of heat insulation paint. When the surface of buildings gets dirty, reflectivity of the light lowers, so that the surface of buildings is likely to adsorb heat, resulting in lowering of the heat insulation effect. The present invention has such object of providing a paint that the tasks of prevention of getting dirty and provision of heat insulation are achieved, decomposition of resin is much lowered, and applying the paint is readily carried out. An emulsion type paint comprising: an organic hollow balloon A having on the surface photo-catalyst minute particles stuck by heat fusion, an organic hollow balloon B having on the surface minute particles other than photo-catalyst stuck by the similar manner, and an organic resin, colloidal silica, and water, characterized in that the organic hollow balloon B is higher in specific gravity than the organic hollow balloon A.

20 Claims, 1 Drawing Sheet

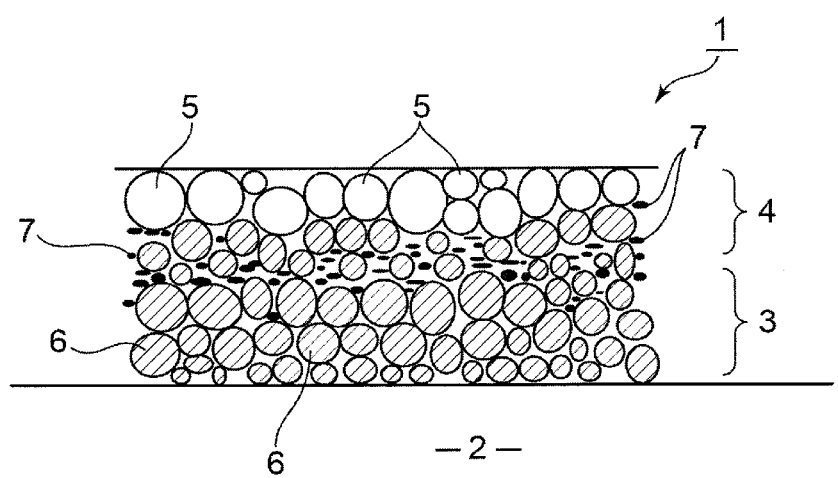

EMULSION TYPE PAINT

FIELD OF THE INVENTION

The present invention relates to an emulsion type paint

BACKGROUND OF THE INVENTION

Recently, buildings are often seen subjected to heat insulation treatment in order to decrease cost of air-conditioning of the buildings and generation of carbon dioxide from the air-conditioning. Since it is hard, in view of costs or other aspects, to provide walls or roofs with a new structure, it is often found that the wall or roof is subjected, on the surface, to application of a heat insulation paint (including those which are able to selectively reflect infrared light).

The heat insulation paint generally mixes hollow members such as glass, shirasu, etc., of a low heat transfer coefficient. The inside of the hollow members is air or to be almost vacuum. And the hollow member itself, which is very much small (10-600 μm), is substantially not broken.

Furthermore, the roof or wall surface of the buildings are naturally exposed to the outside air and mostly get dirty and stained with dust, smokes, etc. When the surface of roofs or walls get dirty and stained, reflectivity of the light lowers, so that the roof or wall is likely to absorb heat, resulting in lowering of the heat insulation effect.

To this situation, it is known to mix in to the paint a photo-catalyst which is able to prevent pollution or decompose polluted substances and cause them to be flowed with rain. Catalyzing function of the photo-catalyst facilitates that any organic substances, etc., adhered on the surface of roof or wall are decomposed, and dispersed into the air or washed away.

Also, a combination of the hollow member and the photo-catalyst is disclosed in the patent document 1 in which fine or minute particles of photo-catalyst are stuck on the surface of the hollow members.

Patent document 1: Japanese Unexamined patent application No. HEI 11-009965.

However, for the invention of the patent document 1, since the photo-catalyst oxidizes and decomposes organic substances, there is a need to take special arrangements to this function when the invention is applied to organic paints. But, there is not at all found such special arrangements in the patent. In addition, the photo-catalyst is stuck to the hollow members by use of an ordinary bonding adhesive. But, there is no consideration of oxidative decomposition of the bonding adhesive. Thus, it is doubtful to practically use the invention of the patent document 1.

GENERAL DESCRIPTION OF THE INVENTION

Tasks the Invention is to Solve

The present invention has such object of providing a paint that the tasks of prevention of getting dirty and stain and provision of heat insulation are achieved, decomposition of resin is much lowered, and applying of the paint is readily carried out.

Means for Achieving the Tasks

The emulsion type paint according to the present invention has been accomplished by the inventor from his zealous study to overcome the problems under the circumstances. The emulsion type paint comprises: an organic hollow balloon A having on the surface photo-catalyst minute particles stuck by heat fusion, an organic hollow balloon B having on the surface minute particles other than photo-catalyst stuck by the similar manner, and an organic resin, colloidal silica, and water, characterized in that the organic hollow balloon B is higher in specific gravity than the organic hollow balloon A.

The present invention is the emulsion type paint with resin component being emulsified with water. Emulsion is that in a first one liquid (water in this case) an other liquid (resin in this case) does not dissolve but uniformly disperse and float in the state of being minute or fine particles, and it is just called emulsion. The resin component may employ any substances such as acryl, vinyl acetate, ethylene vinyl acetate, fluororesin, urethane, or the like.

A first characteristic of the present invention is that the hollow balloon and colloidal silica are mixed with the resin emulsion. Concrete explanation will be given hereunder.

The balloons referred to in the present invention (the hollow balloon) are organic (resin-based) and the inside of the balloon is basically vacuum (or nearly vacuum). But, since the balloons are small in size, they are almost not broken. A material for the balloon may use thermoplastics resin. Most preferable is acrylic resin such as acrylonitrile.

The present invention may employ a commercially available material but not needing to prepare special ones.

The balloons are ordinarily manufactured by heating thermoplastics resin (in the state of being dispersed in the form of particles) to be expanded. Size of the balloon is preferably 10-100 μm, more preferably 30-60 μm. Thickness of the balloon is several μm to 10 μm and is not readily given apertures with oxidization function by photo-catalyst.

Photo-catalyst does, when receiving irradiation of visible light or ultraviolet rays, show function serving as oxidation catalyst. For this, titanium oxide anatase-type crystal is well known. Other photo-catalyst may be also usable. Sizes of minute or fine particles of the photo-catalyst may be around 2-500 nm and more preferably around 20-300 nm.

Minute particles other than photo-catalyst may be provided in size of around 2-500 nm as stone dust or powder, calcium carbonate powder, silica powder, or others, which is heat resistant and low in reactivity. Calcium carbonate is preferable in view of cost and management.

Method for sticking the abovementioned minute particles to the balloons is by fusing but not adhering. It has been found in the experiment made by the inventor that the fusing method can be carried out simply and enabling sticking firmly in comparison with the adhering method. Because of the fusing method, the minute particles when placed on the surface of the balloons are stuck while being cooled, when the resin balloons are dissolved (the state of being not completely dissolved but with viscosity appearing on the surface). Naturally, separate from the balloon expanding operation, heating may be carried out again for the minute particles sticking operation.

The balloons A and B stick on their surfaces different minute particles. The balloon A sticks photo-catalyst, and the balloon B does the particles other than photo-catalyst. In addition, the balloon B is made higher in specific gravity than the balloon A with the balloons each sticking minute particles. It does not matter that whether or not the minute particles themselves stuck to the balloons are higher in specific gravity than the photo-catalyst.

Thus, the minute particles being light if stuck in a large quantity to the balloons make them heavy.

Colloidal silica is colloid of silica (silicon oxide) or its hydrate, diameter of its particles around 10-300 nm. A method of manufacturing may be exemplified as causing dilute hydrochloric acid to act on silicate, followed by dialysis.

Mixing ratio of the components in the present invention, which although should not be limited to this, may be as follows with respect to the resin component of 100 weight part:

Hollow balloon A (with photo-catalyst): 5-20 wt. part
Hollow balloon B (with other particles): 10-30 wt. part
Colloidal silica (calculated as solid content): 1-60 wt. part (more preferably 30-60 wt. part)
Water: 50-200 wt. part The above-mentioned are the essential components for the present invention. Other components may be added on the ground that it does not deviate from the gist of the present invention. For example, it is natural for a paint to add emulsifier, dispersing agent, coloring pigment, or the like. Furthermore, any substances which are ordinarily mixed to paint may be mixed.

Moreover, metal powder may be mixed, such as chrome, aluminum, iron, copper, silver, etc. This is because addition of the conductive agent prevents electrification, and adsorption of dirt by static electricity. The quantity of mixing the metal powder is about 5-15 wt. part with respect to paint component of 100 wt. part.

Also, metal ion may be added, such as silver ion, copper ion, or others. A method of mixing ions may be carried out by that any component(s) which dissolve in resin or water (for example, silver chloride, copper sulfide, etc.) are mixed. The quantity of mixing is about 1-10 wt. part (calculated as ion) with respect to paint component of 100 wt. part.

Mixing ions as abovementioned expects sterilization effect.

Use of the paint according to the present invention is to apply the paint to an outside wall of buildings, metal roof (batten seam, etc), or any places where heat insulation is required. Naturally the paint may be applied to internal walls of the buildings, or to reactors, and so on. Thickness of applying of the paint is freely selected and ordinarily may be about 200-600 μm. And other heat insulation paint or the like may be applied before applying the paint according to the present invention.

Explanation will be given on the function of the paint according to the present invention. The paint according to the present invention is emulsion. When emulsion resin is applied, water evaporates gradually and residual resin component sets. Accordingly, the layer of applied paint becomes or separate into two layer parts, from immediately after the applying, as being water-rich at the surface part, and resin-rich at the deep layer part. This occurs substantially similarly irrespective of specific angles of surfaces on which the paint is applied, the surface being horizontal, vertical, or of any other angles.

The present invention includes the hollow balloons. The hollow balloons have small specific gravity to thereby tend to go out to the surface at the water side of the applied paint. Particularly, the present invention employs two kinds of balloons A and B. Since the side of photo-catalyst is made smaller in specific gravity, photo-catalyst more tends to go out to the surface, leading to separation of the applied paint into two layer parts.

As seen, the hollow balloon A is light and goes out to the surface side (to readily follow movement of water since the smaller specific gravity of the balloon A). It means that photo-catalyst goes out to the surface and it has an effect to cause photo-catalyst to contact with air.

Also, colloidal silica disperses in water to exist at the water side not at the resin side. But, generally, colloidal silica is higher in specific gravity than the balloons, so that colloidal silica is positioned under at least balloon A (at the side of resin) and forms there a layer having a certain extent. Naturally, such layer does not make a complete layer.

And the hollow balloon B is preferably higher in specific gravity than this colloidal silica so as to place the hollow balloon B in a low layer than colloidal silica although the present invention should not be limited to this feature.

Accordingly, preferably, there are formed (separately though not clearly) each layer of hollow balloon A, colloidal silica, hollow balloon B, and resin, respectively, in this order from the surface side of the paint. Hence, oxidization and decomposition effect of photo-catalyst is shut off to some extent, by colloidal silica layer, from extending to the resin layer.

Effect of the Invention

The present invention has the following advantages.
(1) The paint according to the present invention when merely applied forms three layers as a resin layer, photo-catalyst layer, and a protective layer for the resin layer.
(2) Since photo-catalyst is exposed on the surface, dirt adhered on the surface is decomposed with oxidization and decomposition function of photo-catalyst, so that dirt volatilizes or is washed away by rain or the like, by which an effect of preventing of getting dirty can be expected.
(3) The hollow balloons show high heat insulation effect.
(4) Since colloidal silica is employed, photo-catalyst's ability of decomposition is shut off to enable life of resin in the low layer to be longer.
(5) Since photo-catalyst is stuck to the hollow balloons by fusing, it does not readily disconnect from the hollow balloons.
(6) Since there are employed hollow balloons with minute particles (other than photo-catalyst) sticking to the balloons, the quantity of use of expensive photo-catalyst is lowered. And there are provided many hollow parts or sections, heat insulation effect is high.

BRIEF DESCRIPTION OF DRAWINGS

FIG. 1: a sectional view of the applied paint according to an example of the present invention.

EMBODIMENTS TO USE THE INVENTION

Next, the present invention will be detailed with referring to the examples. The present invention should not be limited to the examples.

First, the inventor examined anti-fouling effect of photo-catalyst.

As Example 1, the following paint was prepared.
Resin component: acrylic resin, 100 wt. part (emulsifier is contained by 2-3% but omitted from explanation. The same in the following explanations)
Hollow balloon A: balloon of acrylonitrile (10-50 μm in size) to which fused is photo-catalyst particles (anatase type titanium oxide). 10 wt. part (3 wt. part for photo-catalyst)
Colloidal silica: 5 wt. part Balloon B: balloon of acrylonitrile (10-50 µm in size) to which fused is calcium carbonate powder. 45 wt. part
Water: 100 wt. part A comparative example 1 was prepared without using photo-catalyst and balloons.
Resin component: acrylic resin, 100 wt. part
Colloidal silica: 5 wt. part
Water: 100 wt. part A comparative example 2 contains photo-catalyst but not using balloons.
Resin component: acrylic resin, 100 wt. part
Photo-catalyst: 3 wt. part (mixed, in the form of minute particles, in the resin)
Colloidal silica: 5 wt. part
Water: 100 wt. part A comparative example 3 uses balloon A but not balloon B.
Resin component: acrylic resin, 100 wt. part
Hollow balloon A: balloon of acrylonitrile (10-50 µm in size) to which fused is photo-catalyst particles (anatase type titanium oxide). 10 wt. part (3 wt. part for photo-catalyst)
Colloidal silica: 5 wt. part
Water: 100 wt. part These paints are applied on iron plates and kept intact on the outside for a month. Results and the components are shown in table 1. As clearly seen in the table, definite differences are visually confirmed.

Also, water drops were dropped on the applied paints and contact angles were measured. Definite differences were seen as shown in table 1. Example 1 according to the present invention shows clearly that it is water-soluble to readily clean dirt.

TABLE 1

|  | Example 1 | Comparative example 1 | Comparative example 2 | Comparative example 3 |
|---|---|---|---|---|
| Quantity of resin | 100 | 100 | 100 | 100 |
| Quantity of photo-catalyst | 3 | — | 3 | 3 |
| Balloon A | 10 | — | — | 10 |
| Colloidal silica | 5 | 5 | 5 | 5 |
| Balloon B (calcium carbonate) | 45 | — | — | — |
| Water | 100 | 100 | 100 | 100 |
| Difference from the Example 1 | ☆ | Without photo-catalyst | Photo-catalyst being Kneaded | Without balloon B |
| Visually seen | Almost no change | Rain streak of dirt | Rain streak of dirt | Dirt a little |
| Contact angles | 19° | 80° | 50° | 40° |

Next, heat insulation effect of the present invention was examined.

In addition to the above-mentioned Example 1, Examples 2 and 3 of modified quantities of balloons were also examined.

The above-mentioned paints were applied in thickness of 0.4 kg/m² onto the whole inner wall surface of a box made of an iron plate (thickness about 4 mm) in the form of a cube of 50×50×50 cm. Atmospheric air was placed in the container which kept at 80° C. or 0° C. and was subjected to measuring internal temperatures of the box. Results of measurement are shown in table 2. It is found that heat insulation effect is high due to presence of many balloons.

TABLE 2

|  | Example 1 | Example 2 | Example 3 | Comparative example 4 |
|---|---|---|---|---|
| Quantity of resin | 100 | 100 | 100 | 100 |
| Quantity of photo-catalyst | 3 | 3 | 3 | 3 |
| Balloon A | 10 | 5 | 15 | — |
| Colloidal silica | 5 | 5 | 5 | 5 |
| Balloon B (calcium carbonate) | 45 | 30 | 45 | — |
| Water | 100 | 100 | 100 | 100 |
| Inner surface temperature 1 (80° C.) | 72° C. | 75° C. | 70° C. | 79° C. |
| Inner surface temperature 2 (0° C.) | 6° C. | 5° C. | 6° C. | 0.5° C. |

Next, weather resistance of paint itself (readiness of decomposition of vehicle) was examined.

Paints of Example 1, Example 4 (balloon A of Example 1 being lowered to 3 wt. part), and Comparative example 5 (photo-catalyst being merely kneaded in quantity of 3 wt. part) were examined. Accelerated weathering test 2,500 hr corresponds to almost 10 years of outdoor exposure. Test results are as shown in table 3. Examples of the present invention do almost not show chalking, and comparative example 5 had the chalking phenomenon in a short time.

TABLE 3

| Exposure time (hr) | Example 1 | Example 4 | Comparative example 5 |
|---|---|---|---|
| 250 | No abnormality | No abnormality | Chalking a little |
| 500 | No abnormality | No abnormality | Chalking a little |
| 1250 | No abnormality | No abnormality | Chalking |
| 2500 | No abnormality | Chalking a little | Chalking |

Next, efficiency of balloon B was examined.

The present invention does, to balloon B, stick minute powder other than photo-catalyst. Examined was what is suitable for balloon B.

Example 5 employs calcium carbonate minute powder, Example 6 talc, Example 7 barium sulfate, Example 8 aluminum hydroxide. Each shows effects, and most effective is calcium carbonate as shown in Table 4.

TABLE 4

|  | Example 5 | Example 6 | Example 7 | Example 8 |
|---|---|---|---|---|
| Material Particles to be stuck | Acrylonitrile Calcium carbonate | Acrylonitrile Talc | Acrylonitrile Barium sulfate | Acrylonitrile Aluminum hydroxide |
| Size | 10-50 μm | 10-50 μm | 10-50 μm | 10-50 μm |
| Effect to be expected | The present invention | Whiteness | Whiteness | Fire retardance |
| Defect | None | Clay improved | Hard cake sinking | Gelation |

Shown in FIG. 1 is an example of the state of the components when the paint 1 according to the present invention is applied to the iron plate 2. The FIGURE shows the state of the components before setting or hardening after having been applied. The paint was applied on a horizontal surface but may have substantially the same effect even when the paint is applied on a vertical surface. It is because light things or aqueous things are pulled or drawn to the surface with a force of water content which evaporates and escapes from the surface.

A resin-rich layer 3 positions at the part of paint near the metal surface, and a water phase 4 (where concentration of water is high) positions above the resin-rich layer 3. There is not such apparent distinction. Also, water content does finally evaporate to be almost zero.

Balloon A (accompanied with photo-catalyst, and illustrated in the drawing without hatching) 5, which is light, floats on the surface, and other balloons B (illustrated with hatching) 6 sink into the low part of paint. And colloidal silica 7 exists, in the state of floating, at an intermediate position between the balloons A and balloons B. Specific gravity of the balloons A and B may be regulated to have the positional correlation of the components.

As seen in the drawing, the balloons occupy a large ratio of volume in the paint of the present invention. This has a high effect of heat insulation. In addition, since the balloons A to which photo-catalyst is stuck gather on the surface, the same quantity of photo-catalyst shows a higher effect of anti-fouling in comparison with other type of paint in which photo-catalyst is kneaded.

EXPLANATION OF REFERENCE NUMERALS

1: paint
2: iron plate
3: resin-rich layer
4: water phase
5: balloon A
6: balloon B
7: colloidal silica

What we claimed:
1. An emulsion paint comprising:
   an organic hollow balloon A having on the surface photo-catalyst minute particles stuck by heat fusion,
   an organic hollow balloon B having on the surface minute particles other than photo-catalyst stuck thereon,
   and an organic resin, colloidal silica, and water,
   characterized in that the organic hollow balloon B is higher in specific gravity than the organic hollow balloon A.
2. The emulsion paint as set forth in claim 1 wherein the whole capacity of the organic hollow balloons B and the organic hollow balloons A occupies 50% or more of the capacity of the whole of the paint.
3. The emulsion type paint as set forth in claim 2 wherein the whole capacity of the organic hollow balloons B and the organic hollow balloons A occupies 70% or more of the capacity of the whole of the paint.
4. The emulsion paint as set forth in claim 1 wherein the whole capacity of the colloidal silica occupies 5% or more of the capacity of the whole of the paint.
5. The emulsion paint as set forth in claim 1 wherein the photo-catalyst is titanium oxide and the minute particles other than the photo-catalyst are calcium carbonate minute particles.
6. The emulsion paint as set forth in claim 1, further containing metal powder.
7. The emulsion paint as set forth in claim 1, further containing metal ion.
8. The emulsion paint as set forth in claim 2 wherein the whole capacity of the colloidal silica occupies 5% or more of the capacity of the whole of the paint.
9. The emulsion paint as set forth in claim 3 wherein the whole capacity of the colloidal silica occupies 5% or more of the capacity of the whole of the paint.
10. The emulsion paint as set forth in claim 2 wherein the photo-catalyst is titanium oxide and the minute particles other than the photo-catalyst are calcium carbonate minute particles.
11. The emulsion paint as set forth in claim 3 wherein the photo-catalyst is titanium oxide and the minute particles other than the photo-catalyst are calcium carbonate minute particles.
12. The emulsion paint as set forth in claim 4 wherein the photo-catalyst is titanium oxide and the minute particles other than the photo-catalyst are calcium carbonate minute particles.
13. The emulsion paint as set forth in claim 2, further containing metal powder.
14. The emulsion paint as set forth in claim 3, further containing metal powder.
15. The emulsion paint as set forth in claim 4, further containing metal powder.
16. The emulsion paint as set forth in claim 5, further containing metal powder.
17. The emulsion paint as set forth in claim 2, further containing metal ion.
18. The emulsion paint as set forth in claim 3, further containing metal ion.
19. The emulsion paint as set forth in claim 4, further containing metal ion.
20. The emulsion paint as set forth in claim 5, further containing metal ion.

* * * * *